United States Patent [19]

Kruger

[11] 4,123,788
[45] Oct. 31, 1978

[54] MAGNETIC INFORMATION CARRIER WITH OPTICAL SERVO TRACKS AND APPARATUS FOR READING AND WRITING THE SAME

[75] Inventor: Johann Kruger, Quickborn, Fed. Rep. of Germany

[73] Assignee: U.S. Philips Corporation, New York, N.Y.

[21] Appl. No.: 785,963

[22] Filed: Apr. 8, 1977

[30] Foreign Application Priority Data

Apr. 10, 1976 [DE] Fed. Rep. of Germany ....... 2615838

[51] Int. Cl.² .............................................. G11B 7/08
[52] U.S. Cl. ..................................... 360/77; 360/131; 179/100.3 B; 179/100.3 V
[58] Field of Search ........................... 360/131, 77, 78; 179/100.3 V, 100.3 D, 100.3 B; 318/128

[56] References Cited

U.S. PATENT DOCUMENTS

| | | | |
|---|---|---|---|
| 3,365,706 | 1/1968 | King | 340/173 LT |
| 3,438,050 | 4/1969 | Aschenbrenner et al. | 340/173 LM |
| 3,673,412 | 6/1972 | Olson | 179/100.3 B |
| 4,038,679 | 7/1977 | Bouwhuis et al. | 179/100.3 V |

OTHER PUBLICATIONS

IBM Technical Disclosure Bulletin, vol. 16, No. 11, pp. 3757–3759, Apr. 1974.
IBM Technical Disclosure Belletin, vol. 16, No. 4 Sep. 1973, p. 108, "Optical Servo Information on magnetic recording discs" by J. Schneider.

*Primary Examiner*—John H. Wolff
*Attorney, Agent, or Firm*—Frank R. Trifari; Simon L. Cohen

[57] ABSTRACT

A system for the position control of a write-read head for information carriers with a magnetic storage layer, having optical servo tracks. The servo tracks consist of periodically interrupted lines, whose period length is constant and whose phase relationship differs for adjacent servo tracks. An optical scanner is connected to the magnetic write-read head and is provided with a diaphragm which transmits at the most one line section and at least one overlap between two adjacent line sections to the scanner.

9 Claims, 4 Drawing Figures

MAGNETIC INFORMATION CARRIER WITH OPTICAL SERVO TRACKS AND APPARATUS FOR READING AND WRITING THE SAME

The invention relates to an information carrier with a magnetic storage layer. The invention also relates to an apparatus for reading or writing such an information carrier.

For controlling the position of the write-read head it is possible to record optically readable servo tracks on information carriers, for example in the magnetic layer of a magnetic disc. Such a servo-track can be small relative to the width of a magnetic information track and can be arranged between two adjacent information tracks. In order to avoid cross-talk when reading the magnetic information tracks it is anyway necessary to maintain a certain free distance between the information tracks. The magnetic layer between the information-tracks thus recorded may be distributed so that the optically readable servo-tracks can be arranged between the information tracks. The major advantage of position control by means of optical servo tracks over position control by means of magnetical servo tracks is that the servo-information occupies no storage area or that no data blocks need be interrupted.

It is an object of the invention to carry out the position control of a write-read head for magnetic information carriers with simple means.

According to a first aspect of the invention an information carrier with a magnetic storage layer is characterized in that optical servo-tracks which are present between the magnetic information tracks consist of periodically interrupted lines whose period is constant, while the phase relationship differs for adjacent servo tracks.

According to a second aspect of the invention an apparatus for reading and/or writing an information carrier with a magnetic storage layer by means of a magnetic read-write head, is characterized in that the read-write head is connected to optical scanner for sensing the servo tracks and in that the radiation path of the optical scanner includes a diaphragm which transmits at the most one line section and at least one overlap between two adjacent line sections.

Embodiments of the invention will now be described by way of example with reference to the accompanying drawing wherein.

Figure 2:
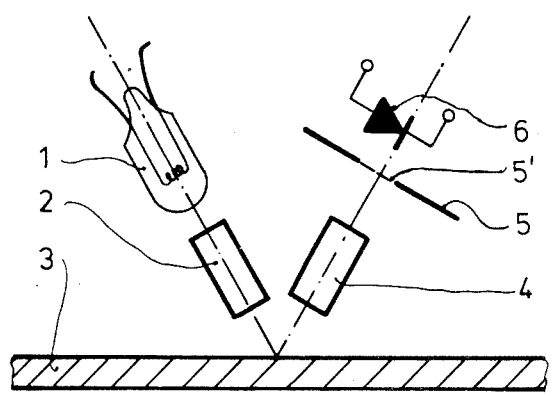

FIG. 2 schematically represents the construction of the optical scanner, and

Figure 3:
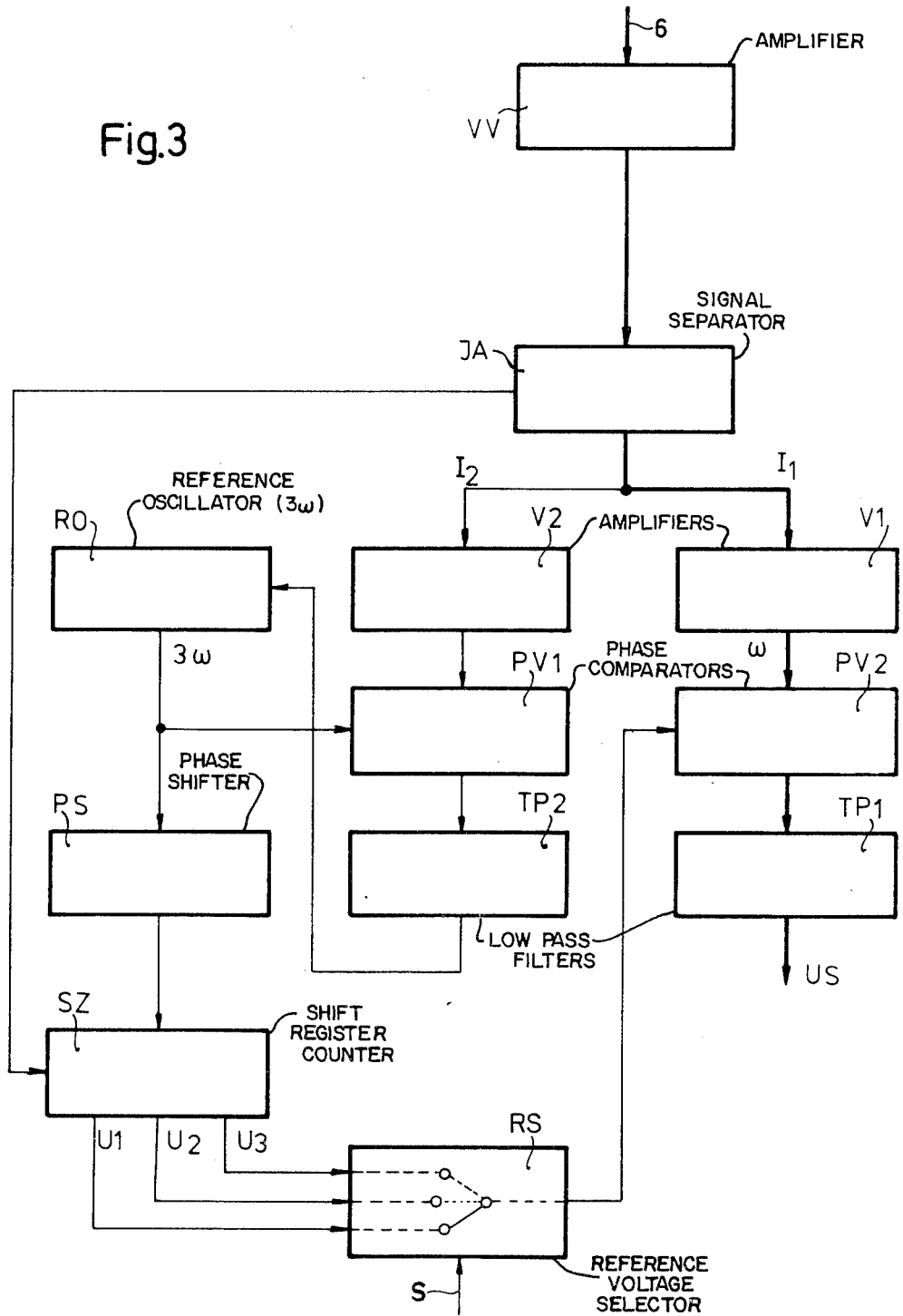

FIG. 3 is a block diagram which illustrates how the position control voltage is obtained.

The servo tracks consist of periodically interrupted lines, a line section $La$ and an interruption $Lu$ preferably having the same length. The period length $\tau$ or in the case of concentric tracks the arc length of a period, should be constant and equal for all servo tracks. However, between adjacent servo tracks there must be a uniform phase shift of exactly $\tau/3$ (see FIG. 1a). In this way the line sections $La$ of all servo tracks viewed transversely to the track direction overlap by exactly $\tau/6$. Of course, this also applies to the interruptions $lu$.

The servo information may be written in the information carrier by a laser beam which burns away the magnetic layer until a reflective layer under the magnetic layer becomes visible. It is also possible to bring the servo information into the information carrier by photolithographic techniques known per se.

The optical scanner (FIG. 2) is rigidly connected to the magnetic write-read head, for example as shown in "IBM Techn. Discl., Bulletin" Vol. 16 Febr. 1976 pag. 3020. It comprises an arrangement of a light source 1, imaging lenses 2 and 4, a diaphragm 5 and a photodiode 6. The lens 2 forms an out-of-focus image of the light source 1 onto the surface of the information carrier 3, so that on this surface a spot with a diameter of several information track widths is uniformly illuminated. The lens 4 images this area onto the diaphragm 5. The light which passes through the specially shaped diaphragm apertures 5' reaches the photodiode 6. It is prerequisite that the optical reflection factor of the servo track and thus of the line sections should differ from the reflection factor of the surrounding area. Thus, the luminous flux changes depending on whether a line section $La$ or an interruption $Lu$ is imaged in the diaphragm aperture (FIGS 1a and 1b).

Figure 1A:
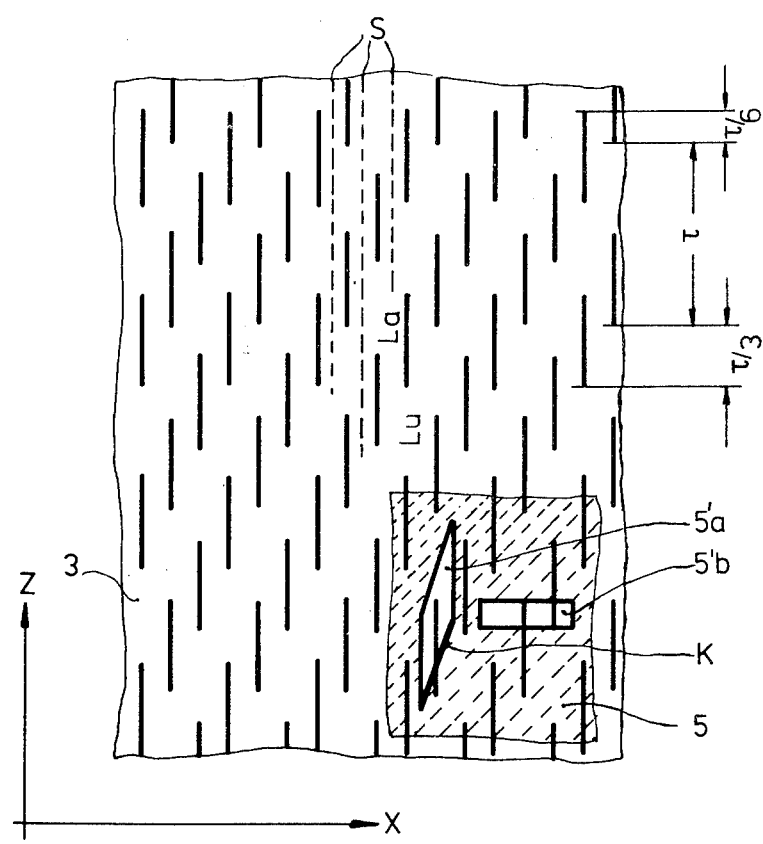
FIG. 1a shows servo tracks with examples of masks.
Figure 1B:
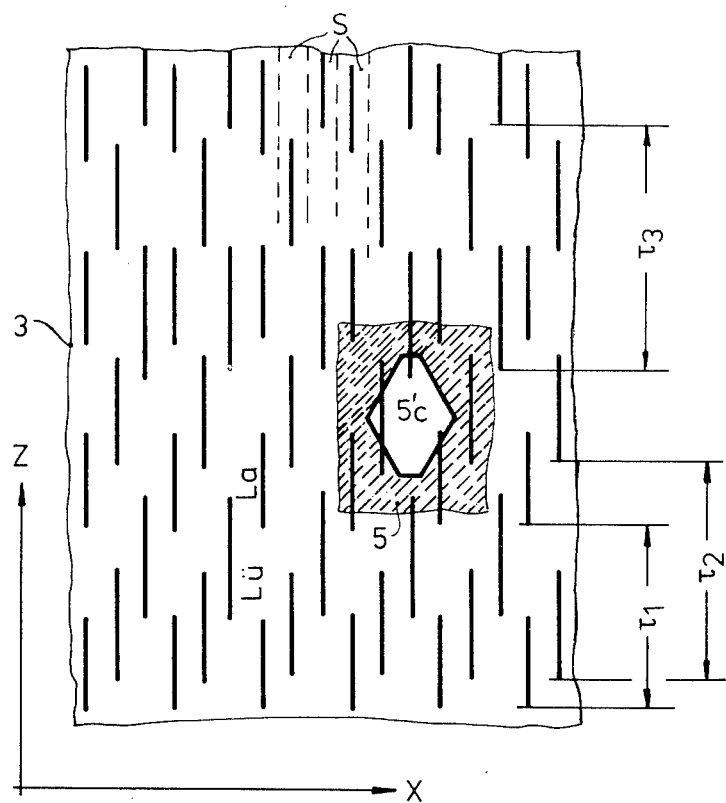
FIG. 1b shows servo tracks and a further example of a mask.

FIG. 1a in addition to the servo tracks S shows the simplest forms of the diaphragm, which may also be a mask with suitable apertures. The two apertures $5'a$ and $5'b$ have different functions: The aperture $5'a$ in the Z-direction substantially correlates with the length of the line sections. The width in the X-direction substantially corresponds to the distance between two servo tracks S. During operation — the information carrier is for example being moved in the Z-direction — the luminous flux through this aperture changes accordingly with the period of the servo track and across the photo diode 6 (FIG. 2) a current $I_1$ is obtained with the angular frequency $\omega$. Owing to the oblique edge K the phase of $I_1$ does not only depend on the servo track which is covered, but also on the position of the track relative to the aperture $5'a$ in the X-direction. $I_1$ thus essentially has the form $I_1 = A \cdot \cos[\omega t + P(x)]$. The opening $5'b$ extends over approximately 1/6 period in the Z-direction and covers several servo tracks S in the X-direction. Owing to this arrangement an additional photo-current $I_2$ is obtained with the angular frequency $3\omega$ and, as may be inferred from FIG. 1a, whose phase is independent of X. The additional photo-current $I_2$ thus essentially complies with the formula $I_2 = B \cdot \cos 3\omega$.

The electronic processing of the signals $I_1$ and $I_2$ into a correction voltage for the X-position of the write-read head is now effected as follows (see FIG. 3): A reference oscillator RO, for example tuned to $3\omega$ is connected to a phase comparator $PV_1$. The signal $I_2$ is amplified by $V_2$ and is, via the phase comparator $PV_1$ and a low-pass filter TP2, locked to the reference oscillator. This serves to ensure that the reference oscillator RO and the frequencies derived from it remain in synchronism, even though the signal flow from the detector 6 is briefly interrupted, for example owing to soiling of the information carrier. The oscillator frequency $3\omega$ is reduced to the angular frequency $\omega$ with a shift-register counter SZ and is divided into three 120° phase-shifted square-wave reference voltages $U_1$, $U_2$ and $U_3$. In a further phase comparator PV2 the signal $I_1$ which has first been amplified in VV and V1 and whose amplitude has been limited by automatic gain control is alternately compared with one of the three reference voltages. At the output of the low-pass filter TP1 the desired control or correction voltage $U_s$ is obtained. The phase-shifter PS is adjusted so that when the write read head is in a central position relative to the information track the reference voltage just used and $I_1$ have a phase difference of 90°, so that the correction voltage $U_s = 0$. By switching to a different reference voltage by means of RS, the reference voltage switch the write read head is then unambiguously centered onto the adjacent right or left track in accordance with the new reference phase (plus or minus 120°).

For counting the traversed tracks direction-dependent counting pulses can be taken from the reference voltage switch RS (track change). Such counting pulses can also be obtained by additional hardware phase comparators between $U_{1,2,3}$ and $I_1$. This last-mentioned step has the advantage that these counting pulses are also available when the write-head is for example continuously moved over the tracks when the control circuit is interrupted. These devices for track counting are not shown in FIG. 3.

After the position control has been switched on, the phase relationship of the reference voltages $U_1$–$U_3$ is trivalent, while the initial set of the shift-register counter SZ and the lock-in point of the reference oscillator RO are arbitrary. An unambiguous relationship is obtained in that in the information tracks of a magnetic disc an optically readable mark is inserted for example one time on the periphery. This mark is read with the same detector. The signal component due to this mark is in a pulse separator stage IA separated from the rest of the signal, and processed to a synchronous pulse. With this synchronous pulse the initial set of the shift-register counter SZ is checked and, as the case may be, corrected, so that an unambiguous phase-relationship of the reference voltages $U_1$–$U_3$ is obtained.

In addition to the synchronous pulses, track identification is possible in a similar way. Finally, it is possible to derive an information clock frequency from the reference oscillator RO. The optical method for the position control of a write-read head can of course also be realized when the phase shift between the periods of adjacent servo tracks is selected to differ from $\tau 3$. In that case it is merely necessary to adapt the geometry of the mask aperture and the electronic circuit accordingly.

In a simplified embodiment the period of the servo tracks is cyclicly changed from track to track. For example every third track has again the same period, the phase relationship being irrelevant. With a changed mask aperture 5'c (see FIG. 1b) for example three servo tracks are then covered in the same time, so that on the photo diode 6 at the same time three frequencies are obtained. These three frequencies are divided into three channels by electronic means. By amplitude comparison of the two outer frequencies in the mask aperture an unambiguous control signal can be obtained. When more frequencies are used the bandwidth necessary for counting the tracks must be increased and moreover the individual frequencies must be accurately separated from each other.

What is claimed is:

1. Information carrier with a magnetic storage layer, comprising optical servo tracks between magnetic information tracks in said carrier said optical tracks being in the form of periodically interrupted lines, of substantially constant period length, the phase relationship between said interrupted lines differing between adjacent servo tracks in a fixed manner.

2. An information carrier as claimed in claim 1, wherein the line sections and interruptions have the same length.

3. An information carrier as claimed in claim 1, wherein the servo tracks are concentric tracks, and wherein the arc length of a period of said lines is substantially constant and equal for all adjacent servo tracks and that there is a uniform phase shift between adjacent tracks of ⅓ of said period.

4. An apparatus for providing head position control signals for a device for magnetically reading and/or writing on an information carrier provided with magnetic information tracks and optical servo tracks between the magnetic tracks said optical tracks being in the form of periodically interrupted lines of substantially constant period length, the phase between said interrupted lines differing between adjacent servo tracks in a fixed manner, said apparatus comprising an optical scanner for sensing the servo tracks, an apertured diaphragm included in the radiation path of the optical scanner and means whereby head position control signals can be generated as a function of the interrupted line or lines.

5. An apparatus as claimed in claim 4, wherein the diaphragm aperture has the shape of a parallelogram.

6. An apparatus as claimed in claim 4, wherein the diaphragm aperture has the form of a rectangle, whose height covers three servo tracks.

7. An apparatus as claimed in claim 4, wherein the diaphragm aperture has the shape of a rhombus.

8. An apparatus as claimed in claim 4, wherein the optical scanner consists of a micro light-source and a photo-diode, the diaphragm being arranged in front of said photo-diode.

9. An apparatus as claimed in claim 4, further comprising at least two amplifier channels each with a phase comparator stage for the signal voltages supplied by the photo detector, the phase comparator stage for one harmonic of the signal voltage being connected to a reference oscillator, a phase shifter, a shift-register counter connected through said phase shifter to said reference oscillator, a switch connecting outputs of said register counter to the phase comparator stage in the other channel for the fundamental frequency of the signal voltages, by which the position control voltage is supplied.

* * * * *